No. 868,010. PATENTED OCT. 15, 1907.
F. H. RICHARDS.
CANDY WORKING MACHINE.
APPLICATION FILED JAN. 7, 1907.
2 SHEETS—SHEET 2.
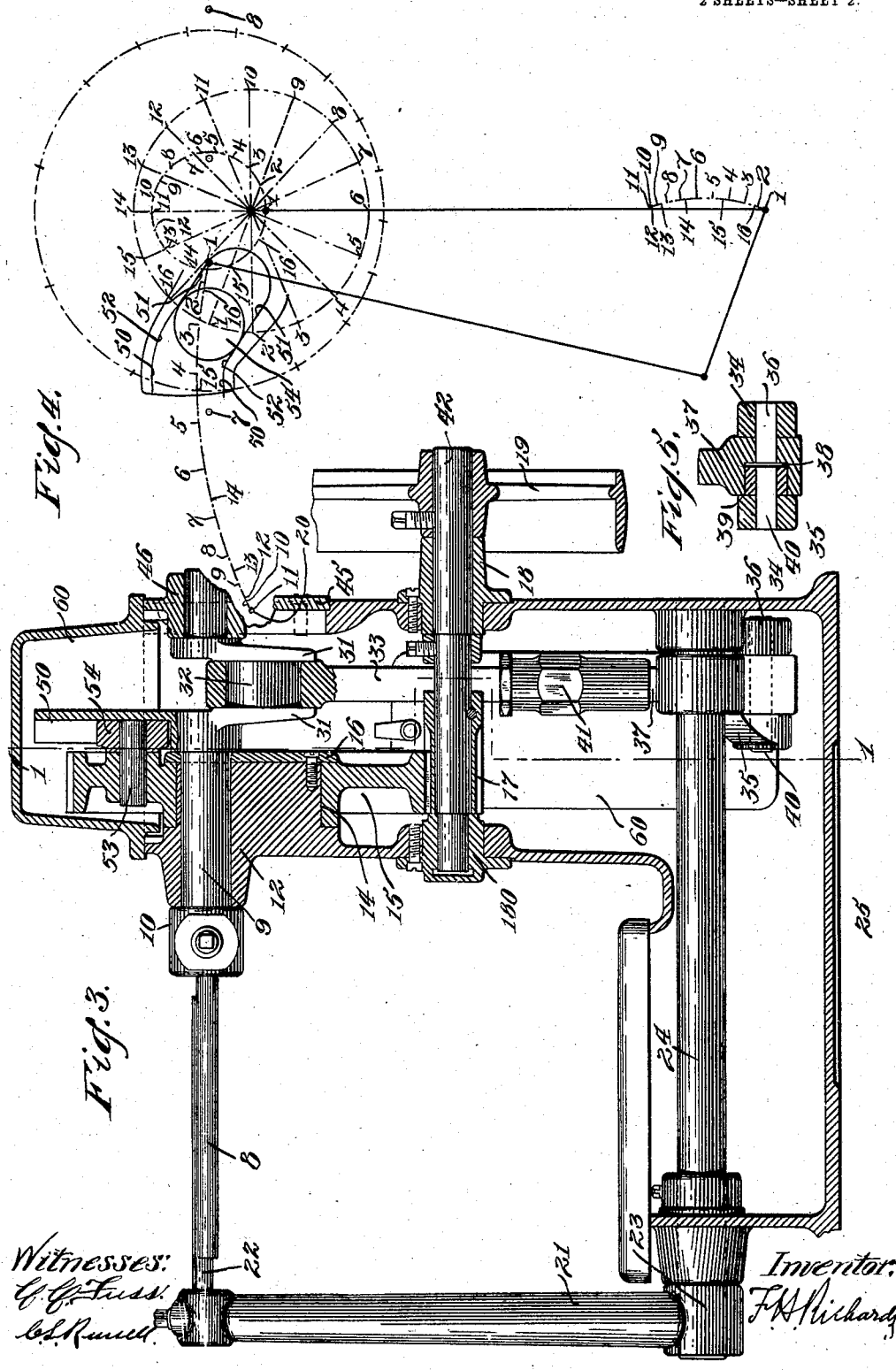

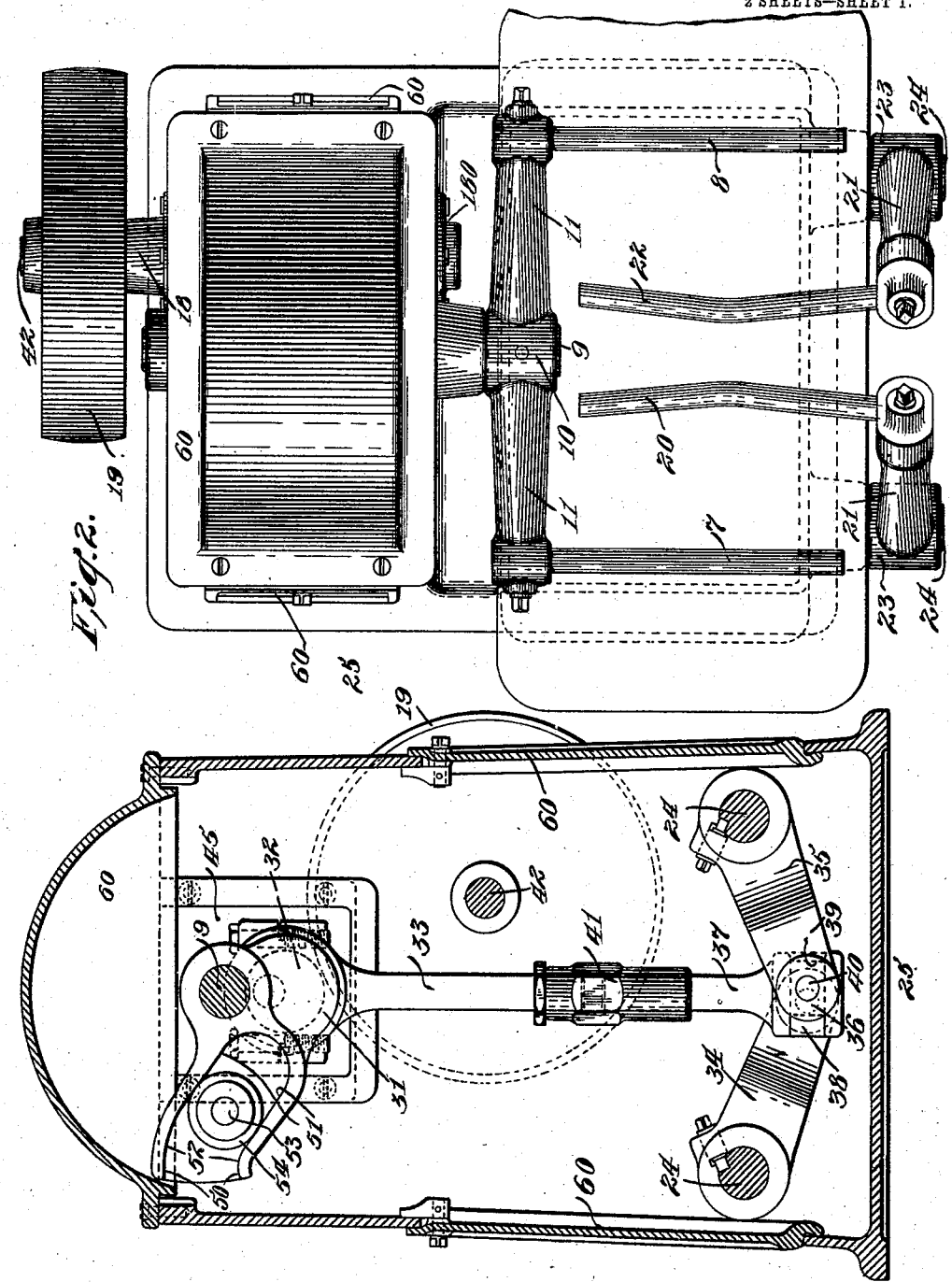

UNITED STATES PATENT OFFICE.

FRANCIS H. RICHARDS, OF HARTFORD, CONNECTICUT.

CANDY-WORKING MACHINE.

No. 868,010.　　　　　Specification of Letters Patent.　　　　　Patented Oct. 15, 1907.

Application filed January 7, 1907. Serial No. 351,093.

*To all whom it may concern:*

Be it known that I, FRANCIS H. RICHARDS, a citizen of the United States, residing at Hartford, in the county of Hartford and State of Connecticut, have invented certain new and useful Improvements in Candy-Working Machines, of which the following is a specification.

This invention relates to mechanism for treating material of a plastic or dough like nature which at a certain stage in its treatment requires a drawing or pulling, working, and kneading action and is closely related to the candy making art, and has for an object to provide an improved apparatus for effecting such treatment and also improved power driven variable speed mechanism in connection therewith.

The invention is somewhat in the nature of an improvement upon the apparatus shown in my concurrently pending application, Serial No. 262,539, filed the 27th day of May, 1905, for candy working machine and embodying an apparatus wherein there are a pair of arms revolved in a circular orbit and a pair of arms which reciprocate back and forth and into and out of such orbit. The mass being treated will, by such arms, be drawn out into three long drafts, which will be lapped together; such mass will be kneaded and during the kneading the unlapped ends will be brought around over the mass which is being kneaded to work the same. This working, drawing, kneading, will be repeated until the material being worked upon has been brought to the desired condition. It has been found that the greatest power is required during the drawing out of the long drafts and that a relatively large amount of power is also required at the kneading operation. It has also been found that certain kinds of material when being worked and pulled can only be drawn out into the long drafts at a certain rate of speed; if the speed is increased, instead of the material throughout the entire strand pulling evenly it will become attenuated in the center and break, which attenuation even if it does not end in breaking or separating the draft, will so modify the action, pulling or treating, that the mass will not be worked, but there will merely be a separation at this point. To avoid which it has been the practice to run the machine at a constant rate of speed, never in excess of the slow speed required at the pulling out of these long drafts. Of course this word "long" must be taken within the limitations of the machine, or for the purpose rather of indicating the distinction between the long and short drafts which some machines of this kind are constructed to draw rather than drafts relatively long in comparison with the candy pulling art as practiced by hand.

This present mechanism is intended principally for use in working, kneading and drawing out and lapping together materials which require such manipulation as a part of their process of manufacture. It may be used upon such plastic materials as dough or material of a dough like character, and upon candy of certain consistencies. The special form of machine herein illustrated is peculiarly adapted for use in the candy making art.

The present improvement embodies a machine whereby the movement of the arms producing the long drafts will be slow enough to accomplish the best results of pulling, and the other movements of the apparatus will be more rapid than this movement, so that the beneficial results of a slow treating will be had, but the rest of the operation will not be retarded to accommodate this difficult portion of the cycle of movement. This will greatly increase the output of the machine, without the employment of additional power, and, in fact, will reduce the amount of power required, since at those periods in the operation when the greatest power is required the parts are moving slowly so that the motor, if a motor is employed, which is driving the apparatus, may be run at a relatively constant speed and its load will not be increased when the hardest part of the work is being performed.

Machines of this character are frequently employed for display purposes and are set up in places where it is inconvenient to have much mechanism about, and the motor will be directly coupled or belted to the driving shaft. And by the present improvement which is organized to accommodate itself to variations in load a much smaller motor can be employed than in an apparatus which does not so accommodate itself. There is also a further advantage in that a given amount of working can be applied to the mass under treatment in a much shorter time by this organization than by others, whereby the duration of the process is materially shortened, which will reduce the cost of labor and of the power employed.

To repeat the above-mentioned two-fold object, in other words; the present improvement produces a mechanism for regulating a variable speed to accommodate certain peculiarities of the material under treatment, the character and requirements of which material will successively vary at constantly recurring stages of the treatment to which it is subjected, and second to the adjustment of the power applied to the apparatus for treating the material so that at each of such successive stages of the treatment the power applied will be varied and regulated in accordance with the varying of the load, so that the load on the motor will remain substantially constant.

In the drawings accompanying and forming a part of this specification, a form of my invention is illustrated wherein Figure 1 is a cross section of a practical form of embodiment of the present invention on the line 1—1 of Fig. 3 looking in the direction of the arrow, but showing the parts in a different position. Fig. 2 is a top plan view thereof. Fig. 3 is a central longitudinal section. Fig. 4 is a diagrammatic chart; and Fig. 5 is a detail of a connection between the eccentric rod and the rock arms for actuating the reciprocatory arms.

The mechanism herein illustrated embodies a pair of arms 7 and 8 which are revoluble about a common axis, in the present instance the axis of rotation of the shaft 9 by which they are carried, such shaft having fastened upon it a hub 10 having arms 11 projecting in opposite radial directions and by which the arms 7 and 8 respectively are carried, so that upon the rotation of the shaft such arms will travel in a uniformly circular orbit. A pair of arms 20 and 22 are mounted for reciprocation into and out of the orbital circuit of the revoluble arms and during each revolution thereof, the organization being such that each revoluble arm during one revolution passes inside of one reciprocatory arm and outside of the other reciprocatory arm. This makes one of the reciprocatory arms come inside the orbit of revolution of one of the arms and outside of the orbit of revolution of the other of said arms; which, according to the method described in my Patent No. 791,920, dated May 30, 1905, there will be given to a mass of suitable material carried by such arms a pulling or working action which will pull the candy into three comparatively long drafts, lap the drafts into a mass having the ends of the drafts overhang the lapped mass, after which pressure will be applied to both sides of the mass to knead the same, during which the overhanging ends will be slightly drawn and wrapped about the mass while the same is being kneaded and worked.

The reciprocatory arms are carried by arms 21 fastened by means of suitable hubs 23, to rock shafts 24, having suitable bearings in the machine frame, designated in a general way at 25. The shaft 9 has a bearing 12 cast integrally, in the present instance, with the machine frame at one side and has a bearing in a removable cap at the other side. The bearing 12 is in an enlarged portion having upon it an external bearing face 14, which bearing face is eccentric to the bearing 12 and consequently eccentric to the axis of the shaft 9. A ring 15 having gear teeth upon its perimeter is mounted upon bearing 14 and is held in place by a plate 16 suitably secured to the enlarged portion affording such bearings 12 and 14; the gear ring 15 is in mesh with the pinion 17 fast on the driving shaft 42, which shaft is supported in bearing members 18 and 180 removably carried by the machine frame and has a pulley 19 which may be driven by a belt from some suitable source of power, not shown. The shaft 9 has midway between its bearings, crank arms 31—31 carrying a crank pin 32 upon which is mounted the eye of a pitman 33, which pitman is adapted to rock the rock shafts 24 for causing the arms 20, 22 to reciprocate. The rock shafts 24 have arms 34, 35 respectively fast upon them; the arm 34 has a pin 36 driven into it and engaging a bearing in the head 37 of the pitman. The opposite side of such head has a slideway 38 in which is mounted a slide 39 which may move back and forth upon the horizontal slideway 38. A pin 40 is driven through the end of the arm 35 and has a bearing in the block 39 so that as the pitman is drawn up and down it will be given a slight oscillation almost imperceptibly, however, in some instances, by the arc through which the pin 36 travels and such movement together with the arc through which the pin 40 will travel will be compensated for by the sliding of the block 39 in its slideways. The relative position of the arms 20 and 22 may be adjusted by a turn buckle 41 in the pitman so that the arms may be placed to give a longer draft or may be located to come closer together for the kneading operation. Upon the revolution of the driving shaft the pinion carried thereby will cause the rotation of the ring 15 about its axis which is eccentric to the axis of the shaft 9, such shaft 9 having fast with it a member having a pair of engaging faces 50, which faces are inclined as at 51 rearwardly of a radial line and as at 52 forwardly thereof. The ring 15 carries a wrist 53 upon which is mounted an actuator roller 54 placed between the faces 50 for rotating the shaft 9 as the ring 15 is rotated. But since the actuator 54 will revolve in an orbit eccentric to the orbit of revolution of the shaft 9, such actuator will at times have a shorter radius line between the axis of the wrist and the shaft 9 than it will have at other times, as illustrated in the diagram in Fig. 4. During the periods when the radius is the longest the shaft 9 and the crank pin 32 will be rotated and revolved at a slower speed than when such radius is shorter. For the purpose of still further retarding and accelerating the movement of the arms 8, at certain periods of their cycle for operation, without increasing the size of the parts, and producing a relatively greater difference in the extreme lengths of radius, the engaging faces 50 are inclined forwardly and backwardly of a radial line as above alluded to, so that there will be a curved movement, as it were, of the actuator in making an excursion, which will augment the retardation and acceleration in excess of that which would be had were the faces 50 in such a position that the wrist 53 would move in a radial line. The positions indicated in the chart for the pairs of arms 7, 8, 20 and 22 are those they occupy at the completion of pulling three long drafts. The outward movement of one of the reciprocatory arms will commence at the point 1 and travel with decreasing speed to the point 11 when it will start on its return excursion. The travel between the points 11 and 12 being slow, as will be necessary after the reciprocatory member has been brought to a stop and started on its return movement, after which, as will be seen at the point 12, the movement will be accelerated up to the point 16 when the movement will again be retarded. This is not only for permitting the commencement of the outward excursion, but also to accommodate the kneading operation, which will require a greater application of power than the lapping or folding and may at times be best accomplished by a slow movement. It will also be seen that the parts may be so assembled that the kneading operation will take place while the crank pin is passing into and out of the dead center; which, as it is well known is a position giving an operation after the analogy of a toggle and one which utilizes the greatest strength or power of the mechanism without throwing additional load upon the motor.

This is a form of mechanism which is of simple construction and may be largely cast, the member affording the bearings 12 and 14 may be cast with the machine frame and the bearings trued up on a boring machine, the plate 45, carrying the bearing 46 for the outer end of the shaft 9, covers an opening through which access may be had to the bearing face 14. The other bearings are shown carried by caps or plates which may be readily removed. A strong bearing is afforded for the ring 15 so that the drag upon it from doing its work will not cause disalinement of the parts, and the crank pin is so positioned that the crank is supported at both sides of it and at both sides of the member which carries the bearing faces 50 so that the application of power and the delivery of power are between substantial bearings. The frame may be provided with doors or caps 60 so held in place by suitable means that access may be had to the mechanism when occasion may demand. The parts as a whole are securely housed and will be kept out of harms way and sheltered from dust and dirt, so that lubricant applied to them will not find access to and contaminate the material under treatment.

Having described my invention I claim:

1. In a machine of the character described, the combination with a number of arms for working a mass of material, of a shaft for actuating said arms, an engaging member, means for revolving the actuator in an orbit eccentric to the axis of said shaft, said shaft having an engaging face obliquely disposed to its radius for said actuator.

2. In a machine of the character described, the combination with means for working a mass of material, of a shaft for actuating said means, an actuator and means for revolving the actuator in an orbit eccentric to the axis of said shaft, said shaft having a face for engagement with said actuator and inclining away from and then toward the direction of rotation of said shaft for actuating said working means alternately at rapid and at slow speeds for working said mass by a series of alternate slow and rapid sequential steps.

3. In a machine of the character described, the combination with a number of arms for working a mass of plastic material comprising a pair of arms for reciprocation toward and from each other and a pair of arms for revolution in an orbital path, a pair of rock shafts carrying said reciprocatory arms and rock arms fast on said rock shafts, a shaft carrying said orbitally movable arms and a crank on said shaft, a pitman articulated to said rock arms and to said crank, an actuator and means for revolving this in an orbit eccentric to said shaft, and a member fast on said shaft provided with bearing faces for said actuator inclining away from and then toward the direction of rotation of said shaft for actuating said arms alternately at rapid and slow speeds for working said plastic mass by a series of alternate slow and rapid sequential steps.

4. In a machine of the character described, the combination with means for engaging a mass of material and embodying a pair of arms reciprocatory in opposite directions and a pair of arms movable in an orbital path, a shaft for actuating said arms, a member fast with said shaft and having a pair of faces inclining rearwardly of the radius of said shaft and then forwardly of the said radius, an actuator roll revoluble in a circular orbit eccentric to the axis of said shaft and in engagement with said faces, means for revolving said roll at a uniform speed, the acceleration and retardation of the rotation of the shaft, due to the variation in length of the radius between the axis of said roll and the axis of said shaft, being respectively augmented by the departure of the line of said faces from the said radius line, for moving said reciprocatory arms rapidly toward each other and slowly away from each other, and for coincidently moving said orbitally movable arms.

5. In a machine of the character described, the combination with a number of arms for working a mass of material embodying a pair of arms for reciprocation toward and from each other, a pair of rock shafts for carrying said arms, a pitman articulated to said rock shafts for rocking the same, a crank shaft carrying said pitman, a pair of arms movable in an orbital path and revoluble by said shaft, a member fast with said shaft and having a pair of faces inclining rearwardly of the radius of said shaft and then forwardly of said radius, an actuator roll revoluble in an orbit eccentric to the axis of said shaft and in engagement with said faces, the acceleration and retardation of the rotation of the shaft due to the variation in length of the radius between the axis of said roll and the axis of said shaft being respectively augmented by the departure of the line of said faces from the said radius line for moving said reciprocatory arms rapidly toward and slowly away from the axis of revolution of said orbitally movable arms and for moving all said arms in coincidence.

6. In a machine of the character described, the combination with a plurality of revoluble arms, a pair of oppositely disposed reciprocatory arms adapted to pass radially through the orbit of revolution of said arms and engage a mass of material carried by such arms and to press the same toward the axis of revolution of said arms during the revolutions thereof and to move away from said axis in opposite directions and at a retarded speed to slowly pull the said material into long drafts, of a shaft upon which the revoluble arms are mounted, means for revolving the shaft, said shaft having a crank, rock shafts carrying the reciprocatory arms, a rock arm upon each of said rock shafts, a pitman articulated to said crank and it having a head, a wrist carried by one of said rock arms and articulated to one side of said head, a slideway upon the said head, a slide mounted therein, and a wrist pin carried by the other of said rock arms and articulated to said slide.

7. In a machine of the character described, the combination with a plurality of arms for working a mass of material, of a framework for carrying the same and embodying a box-like construction having an integral inwardly projecting enlargement affording a bearing for some of the parts and an outer peripheral machined bearing face upon said enlargement, said frame having an opening opposite said enlargement, and a removable cap for said opening and a bearing carried by said cap.

8. In a machine of the character described, the combination with a plurality of arms for working a mass of material, of a framework for carrying the same and embodying a box-like construction having an integral inwardly projecting enlargement having a bearing through it for some of the parts and an outer peripheral machined bearing face upon said enlargement, an opening opposite said enlargement, a removable cap for said opening and a bearing carried by said cap in line with the bearing through said enlargement, a shaft mounted in said bearings and having a crank between them, a pitman connected to said crank for operating some of said arms, other of said arms being carried by said shaft, a ring having gear teeth upon its outer perimeter and mounted eccentrically to said shaft, a driving shaft having a gear in mesh therewith, an engaging face upon the crank shaft, and means of engagement between said ring and engaging face.

9. A candy working machine having a pair of revoluble arms and a pair of reciprocatory arms, and framework for the same embodying a housing, it having upon one side an enlarged inwardly projecting portion and a bearing through such portion, a shaft mounted in said bearing and carring the revoluble arms, said enlarged portion having a machined bearing face upon its outer side eccentric to the said shaft bearing, a removable cap at the opposite side of said housing, said cap having a bearing in alinement with the shaft bearing, said shaft having cranks and a crank pin between such bearings, a pair of rock shafts for carrying said reciprocatory arms, each of said rock shafts provided with a rock arm, a pitman articulated thereto and to said crank pin, a pair of radially extending engaging faces carried by the shaft adjacent to said crank, a ring having gear teeth upon its perimeter mounted upon said external bearing, a roller carried upon said ring and engaging said faces, and a driving shaft and gear in mesh with said ring for driving the same.

10. In a machine of the class described, the combination with a pair of revoluble arms, a shaft upon which the said arms are mounted, means for revolving the shaft, said shaft having a crank, a pair of reciprocatory arms, rock shafts carrying the same, a rock arm upon each of said rock shafts, a pitman articulated to said crank, it having a head, a wrist carried by one of said rock arms and articulated to one side of said head, a slideway upon the other side of said head, a slide mounted therein and a wrist pin carried by the other of said rock arms and articulated to said slide.

11. The combination with a rotary shaft and means for rotating the same, of a crank on said shaft, a pitman articulated to one end of said crank, a rock shaft on each side of the other end of said pitman, an arm fast on each rock shaft and having a sliding connection with said other end of the pitman, and coöperative working arms controlled by said rotary shaft and rock shafts.

Signed at my office, Nos. 9-15 Murray street, New York, N. Y., this 21 day of December, 1906.

FRANCIS H. RICHARDS.

Witnesses:
 FRED. J. DOER,
 JOHN O. SEIFERT.